(12) United States Patent
Lerner

(10) Patent No.: US 8,238,898 B2
(45) Date of Patent: Aug. 7, 2012

(54) WIRELESS ACTIVE MONITOR SYSTEM FOR CONTAINERS AND CARTS

(75) Inventor: Ian Lerner, La Jolla, CA (US)

(73) Assignee: Ian Lerner, La Jolla, CA (US)

( * ) Notice: Subject to any disclaimer, the term of this patent is extended or adjusted under 35 U.S.C. 154(b) by 343 days.

(21) Appl. No.: 12/475,049

(22) Filed: May 29, 2009

(65) Prior Publication Data

US 2010/0304672 A1 Dec. 2, 2010

(51) Int. Cl.
*H04W 24/00* (2009.01)
(52) U.S. Cl. .......... 455/423; 455/518; 177/139
(58) Field of Classification Search ........ 455/404.2, 455/423, 435.1, 458, 41.1, 41.2, 41.3, 517, 455/518, 519; 340/901, 613, 539.13, 545.6, 340/585; 701/10, 25, 29, 32, 42, 207; 705/308; 177/135, 136, 137, 139; 180/65.1
See application file for complete search history.

(56) References Cited

U.S. PATENT DOCUMENTS

| 7,098,784 | B2 * | 8/2006 | Easley et al. | 340/539.13 |
| 2002/0059075 | A1 * | 5/2002 | Schick et al. | 705/1 |
| 2008/0140253 | A1 * | 6/2008 | Brown | 700/245 |

* cited by examiner

*Primary Examiner* — Ping Hsieh
(74) *Attorney, Agent, or Firm* — ARC IP Law, PC; Joseph J. Mayo

(57) ABSTRACT

Wireless active monitor system for containers/carts that hold item(s). Includes a container mount, and sensor for example to weigh the item(s), and a wireless transmitter/transceiver to transmit sensor data from the sensor to a database for remote access. The sensor may be protected via shock pads to prevent damage to the sensor if the container is dropped. The system may be implemented with a printed circuit board having a central processing unit and memory that holds program code to execute on the central processing unit, for example to transmit sensor data via the wireless transmitter. May utilize a unique identifier associated with each container, and/or vehicle utilized to interface with the container. Enables rapid determination of the physical characteristics associated with items in the container without requiring physical contact with the container. For example, allows the weight of garbage containers to be determined remotely.

20 Claims, 9 Drawing Sheets

FIGURE 6

| TRUCK ID | Type | Route | Lifts | Load |
|---|---|---|---|---|
| WM-1234 | Model FG-988 | SouthEast 76 | 87 | 5.6 Tons |
| WM-1235 | Model FG-988 | SouthEast 77 | 67 | 3.6 Tons |
| WM-1236 | Model FG-988 | SouthEast 98 | 27 | 1.8 Tons |
| WM-1237 | Model FG-988 | South 16 | 127 | 9.6 Tons |
| WM-1238 | Model FG-988 | South 29 | 137 | 11.5 Tons |
| WM-1239 | Model FG-988 | South 55 | 74 | 5.6 Tons |
| WM-1240 | Model FG-988 | East 176 | 57 | 4.6 Tons |
| WM-1241 | Model FG-988 | East 172 | 87 | 5.9 Tons |
| WM-1242 | Model FG-988 | East 112 | 77 | 6.6 Tons |
| WM-1243 | Model FG-988 | East 116 | 121 | 12.6 Tons |

FIGURE 7

| CONTAINER ID | CUST ID | Time | Load | Batt |
|---|---|---|---|---|
| NW-1234455 | 734455 | 08:05 | 1,6100 lbs | OK |
| NW-3244343 | 734455 | 08:07 | 1,117 lbs | OK |
| NW-5334442 | 734455 | 08:08 | 1,324 lbs | OK |
| NW-8755444 | | | | FAIL |
| NW-9123838 | 931151 | 08:15 | 1,152 lbs | OK |
| NW-1239544 | 931188 | 08:26 | 660 lbs | OK |
| NW-7421240 | 711125 | 08:28 | 2,263 lbs | OK |
| NW-9831241 | 700981 | 08:31 | 920 lbs | OK |
| NW-7765242 | 700981 | 08:38 | 1,067 lbs | LOW |
| NW-6641243 | 987113 | 08:44 | 2,320 lbs | OK |

FIGURE 8

Sensors - 810

| Make | Model | Price |
|---|---|---|
| AMCELLS | LPD | $30 - $40 |
| LOADSTAR | MFM-200-100-S | $40 |
|  | LAD-500-025-S | $399 |
| Omega | LC105 | $295 |
|  | LC305 | $480 |
|  | LC703 | $295/S395 |

Phones - 820

| Make | Model | Carrier | O/S |
|---|---|---|---|
| Apple | iPhone | AT&T | Apple |
| Google | Android | T-Mobile | GOS |
| Motorola | Q-Phone | Verizon | Windows |
| Samsung | Saga | Verizon | Windows |
| Samsung | Blackjack/Epix | At&T | Windows |
| Palm | Treo | Verizon | Windows |
| Verizon | XV6800 | Verizon | Windows |
| Verizon | XV6900 | Verizon | Windows |
| Blackberry | Storm | Verizon | Blackberry OS |
| Palm | Centro | Verizon | Palm OS |
| Pantech | Duo | AT&T | Windows |

PDA - 830

| Make | Model | O/S |
|---|---|---|
| Apple | iTouch | Apple |
| Google | Android | GOS |
| DELL | X50 | Windows |
| HP | HP ComPAQ | Windows |
| ASUS | Various | Windows |
| Palm | Pilot | Palm OS |

Wireless Technology - 840

| Type | Make | Power | Interface |
|---|---|---|---|
| BlueTooth | BlueTooth | 10mA |  |
| Zigbee | Atmel | 20mA | SPI |
| Zigbee | Cypress | 20mA |  |

WIRELESS ACTIVE MONITOR SYSTEM FOR CONTAINERS AND CARTS

BACKGROUND OF THE INVENTION

1. Field of the Invention

Embodiments of the invention described herein pertain to the field of containers. More particularly, but not by way of limitation, one or more embodiments of the invention enable a wireless active monitor system for containers and carts.

2. Description of the Related Art

Currently available containers and carts are non-intelligent objects that store items. The containers and carts may be stationary or mobile so long as they hold items. The items have associated physical quantities associated with them. The physical quantities associated with the items are difficult or impossible to measure without performing an action on the containers or carts.

For example, to obtain the weight of the items in a container or cart, current systems may physically lift, hold steady and weigh the container or cart. This operation takes skill, namely to steady the cart, and time which incurs a cost associated with labor related to the physical lifting operation. An example of this type of system is found in U.S. Pat. Ser. No. 5,837,945, to Cornwell, et al, filed 17 Nov. 1998.

Another device, under the trademark UP-SCALE®, is utilized as an under-container scale. The under-container scale is physically unloaded, moved under a container, and forced upward to support the container. The manufacturer does not recommend use of the apparatus for every pick-up, but rather only for suspicious cases due to the labor intensity and time involved with performing the measurement. In addition, the device may cost thousands of dollars.

RFID devices have been attached to various objects to identify the objects. When such devices are attached to containers, there is no possibility of measurement of physical quantities associated with items in the container for example.

When collecting garbage, a garbage truck is weighed on entry to a dump site. In this example, the items from individual containers are not weighed separately, but rather as a whole after collecting a large number of containers. This method does not allow for high weight containers to be charged differently from lightly loaded containers. A better option would be to wirelessly weigh each container without requiring the container to be lifted and steadied, or alternatively raised with an under-container scale. In this manner, the entity leasing the container could be charged based on weight instead of based on the volume of the container.

There is currently no known wireless active monitor system for containers and carts that allows for physical measurements to acquired without physical contact with a container or cart. For at least the limitations described above there is a need for a wireless active monitor system for containers and carts.

BRIEF SUMMARY OF THE INVENTION

One or more embodiments of the invention enable a wireless active monitor system for containers and carts. Embodiments may utilize one or more circuit boards such as Wireless Access Module (WAM) circuit boards to provide for embedded functionality associated with the container. In addition, the system may also include a sensor that can ascertain a physical quantity associated with items in the container, for example the weight of the items in the container. Embodiments of the system may utilize inexpensive load cells as sensors for example. In one or more embodiments, one or more load sensors may be mounted between the wheel casing and cart. Optionally, a shock pad or spring mount may interface between the container and the sensor to provide a measure of robustness with respect to physical forces that are imparted onto the sensor. Embodiments may also include a unique identifier for each container and a wireless transmitter or transceiver configured to transmit the unique identifier, for example from the circuit board. The system may include any type of energy source, for example a battery. Any other type of sensor that can be utilized to measure the physical characteristics of items within a container or cart may be utilized in one or more embodiments of the system. For example, embodiments of the sensor may measure any other physical characteristic of the items in the container, or associated with components of the apparatus, or of the environment, such as temperature, humidity, location, light levels, gas and/or liquid chemical compositions or percentages or any other physical item limited only by the type of sensor utilized for the intended application. By measuring the location, a determination of whether the container has been relocated, misplaced or stolen may be determined.

The system may further include a receiver, for example mounted on a truck. One example of a receiver that may be utilized includes a cell phone, 3G phone or PDA or any other mobile communication device that is configured to obtain information from the sensor. One potential implementation of a communications protocol that may be utilized in communicating container-associated data with an external receiver may include the Zigbee protocol. Any protocol capable of transferring data from the transmitter associated with the container and the receiver associated with the truck may be utilized.

In addition, the system may further include a database that can for example be utilized to aggregate collected data from one or more containers and or one or more trucks. A collection reporting system or web interface may be utilized for observing the results. The collection reporting system or web interface may couple with an application server, web server or simply interface with the database depending on the number of containers and trucks utilized in the implementation. The data collected from the receiver for example may be input into the database with a direct connection with a truck returns to a service center or over a wireless communications network for example. In one or more embodiments of the invention, the receiver associated with the truck may also include a transmitter that is utilized to transmit data to the database wirelessly for example.

In other embodiments of the invention, no truck is required and the containers may simply wirelessly transmit sensor data to the database, for example a configurable time intervals, or when the sensor data changes. For example, a central processing unit on the printed circuit board associated with the container may wake-up occasionally and either check for a request to transmit sensor data, or may either check if the sensor data has changed or simply send the sensor data to the database at the configurable time interval.

The system allows for rapid wireless data collection of accurate weights as a truck nears a container for example, and without requiring direct physical contact between the truck and container. The sensor associated with the container may be activated when a truck approaches or may poll at defined time intervals. The transmitter associated with the container may send data to a truck using a short-range wireless technology or may be sent to the database a long-range wireless technology such as a cell phone without interaction with a truck. This may allow for a container company to determine if a container is being illegally filled at night, or if an early pick-up is warranted if the container is over a threshold weight. Alternatively, both short-range and long-range wireless technologies may be associated with a single container wherein the communication technology utilized may vary based on the desired functionality.

BRIEF DESCRIPTION OF THE DRAWINGS

The above and other aspects, features and advantages of the invention will be more apparent from the following more particular description thereof, presented in conjunction with the following drawings wherein:

FIG. 6 is a truck list showing trucks, truck type, route, number of lifts and load collected.

FIG. 7 is a container list associated with each truck of FIG. 6, wherein the list shows the container identifier, customer identifier, time of pickup, load picked-up, and battery status.

FIG. 8 is a list of sensors, phones, personal digital assistants (PDAs), and wireless technologies that may be utilized to implement a particular configuration depending on the requirements.

DETAILED DESCRIPTION OF THE INVENTION

A wireless active monitor system for containers an carts will now be described. In the following exemplary description numerous specific details are set forth in order to provide a more thorough understanding of embodiments of the invention. It will be apparent, however, to an artisan of ordinary skill that the present invention may be practiced without incorporating all aspects of the specific details described herein. In other instances, specific features, quantities, or measurements well known to those of ordinary skill in the art have not been described in detail so as not to obscure the invention. Readers should note that although examples of the invention are set forth herein, the claims, and the full scope of any equivalents, are what define the metes and bounds of the invention.

Figure 1:
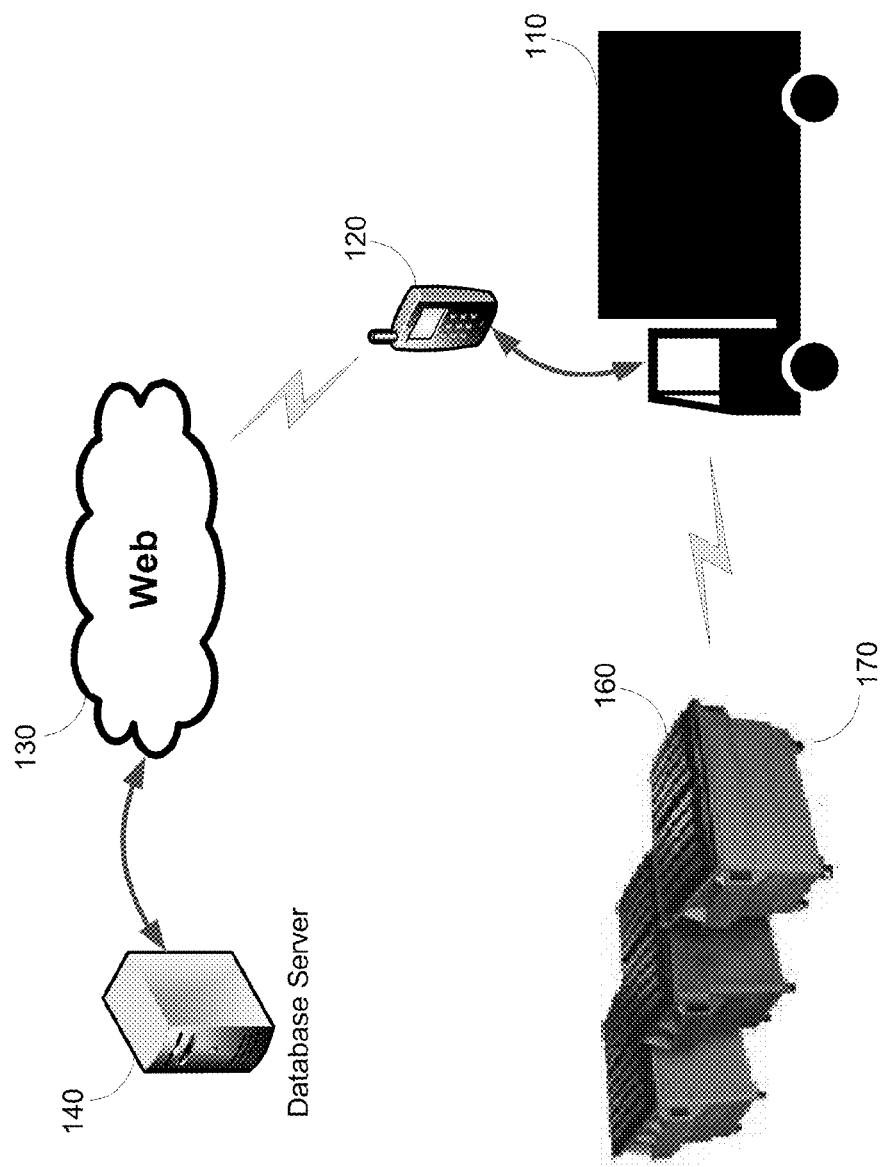
FIG. 1 is a view of an embodiment of the system.

FIG. 1 is a view of an embodiment of the system. Containers 160 hold at least one item and are shown in the lower left portion of the figure. Optionally, each container may have at least one wheel 170 for example. In other embodiments, the container are not mobile and may utilize legs or other fixed supports for example. A sensor (see FIG. 2) may be coupled to the container, for example via a container mount between at least one wheel 170 and the container. The sensor is configured to produce sensor data associated with the at least one item associated with the container. In one or more embodiments, the sensor data may produce data associated with any physical characteristic of the at least one item, system component such as power source voltage, or any environmental physical variable. For example, the sensor may measure temperature of any component of the system or of the environment whether internal or external to the container and any other physical characteristic including but not limited to light values, humidity, location, light levels, gas and/or liquid chemical compositions or percentages or any other physical item limited only by the type of sensor utilized for the intended application. In addition, a wireless transmitter may be coupled to the sensor and utilized to transmit sensor data from the container. The sensor data for example may be associated with weight. The wireless transmitter may also send a unique identifier associated with the container so that the sensor data may be associated with a particular container. The sensor data may be stored for example in database 140. In one or more embodiments, the sensor data may be transmitted wirelessly to database server 140 without use of a truck, for example at configurable time intervals, or may be transmitted to truck 110 wirelessly. The transmission of data may occur on a configurable time interval or when truck 110 requests the data, for example using a short-range wireless protocol such as BLUETOOTH® or ZIGBEE®. Alternatively, both methods may be utilized, for example a truck may request data and a container may transmit data to the database directly over a wireless data channel if for example the sensor data changes or at configurable time intervals. If truck 110 receives the sensor data, for example using a short-range wireless technology, then truck 110 may utilize a second transmitter to transmit sensor data to database server 140 or may download the data directly over a cable or memory card for example on return to the service center associated with the truck. The transmission of sensor data may occur over the Internet or any other data channel and may allow for access of the sensor data via a Web based HTML interface 130.

Figure 2:
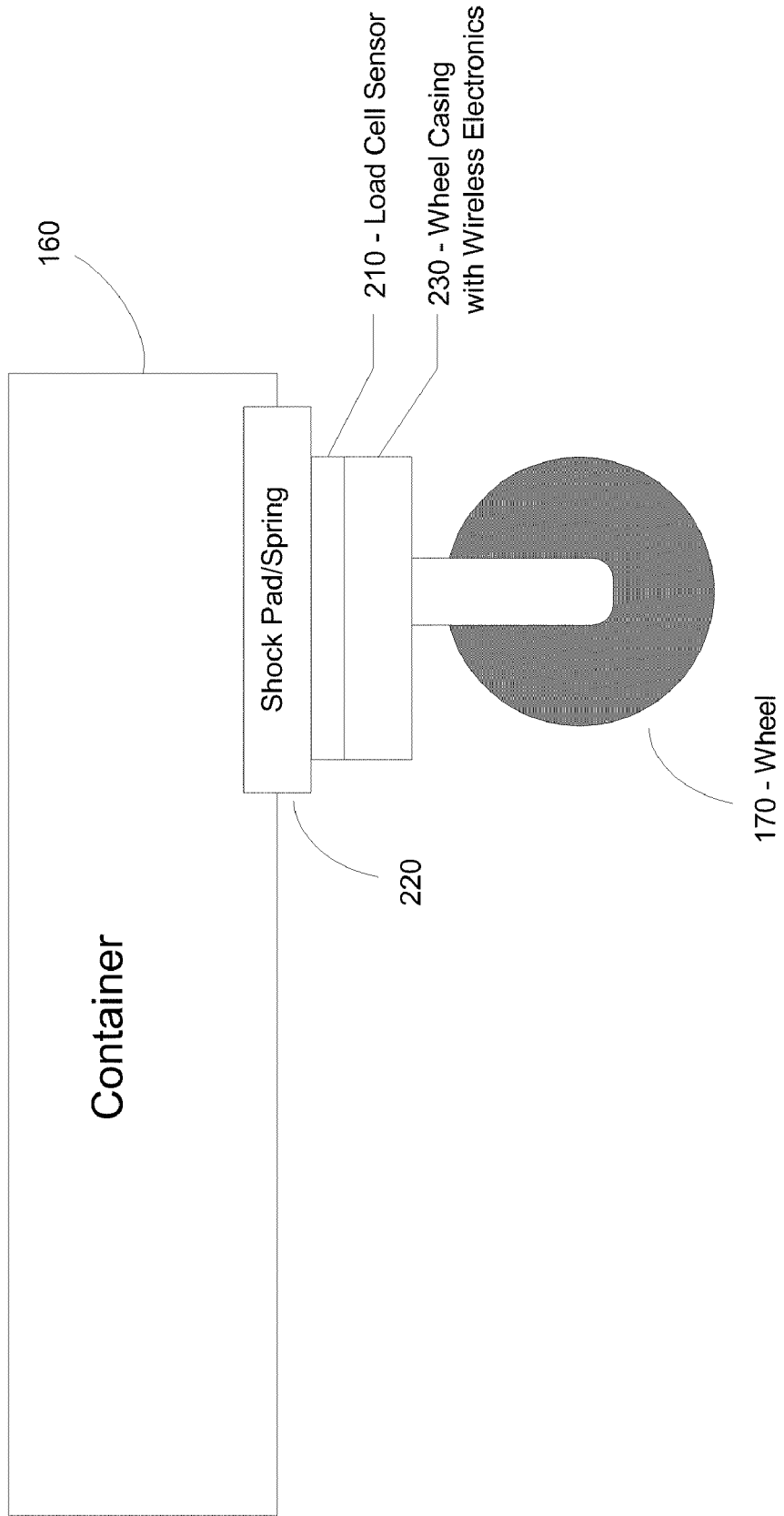
FIG. 2 is a view of a container coupled to an embodiment of the sensor of the system.

FIG. 2 is a view of a container coupled to an embodiment of sensor 210 of the system. In this figure container 160 couples to an optional shock pad/spring 220 to protect the sensor from hard impacts, for example when container 160 is dropped from a truck after it is emptied. Sensor 210 may be implemented as a load sensor for example. In the embodiment shown, sensor 210 may couple to wheel casing 230 that allows wheel 170 to enable container 160 to move. Alternatively, sensor 210 may couple to any other support such as a leg or may itself be fashion into the shape of a leg for non-mobile implementations.

Figure 3:
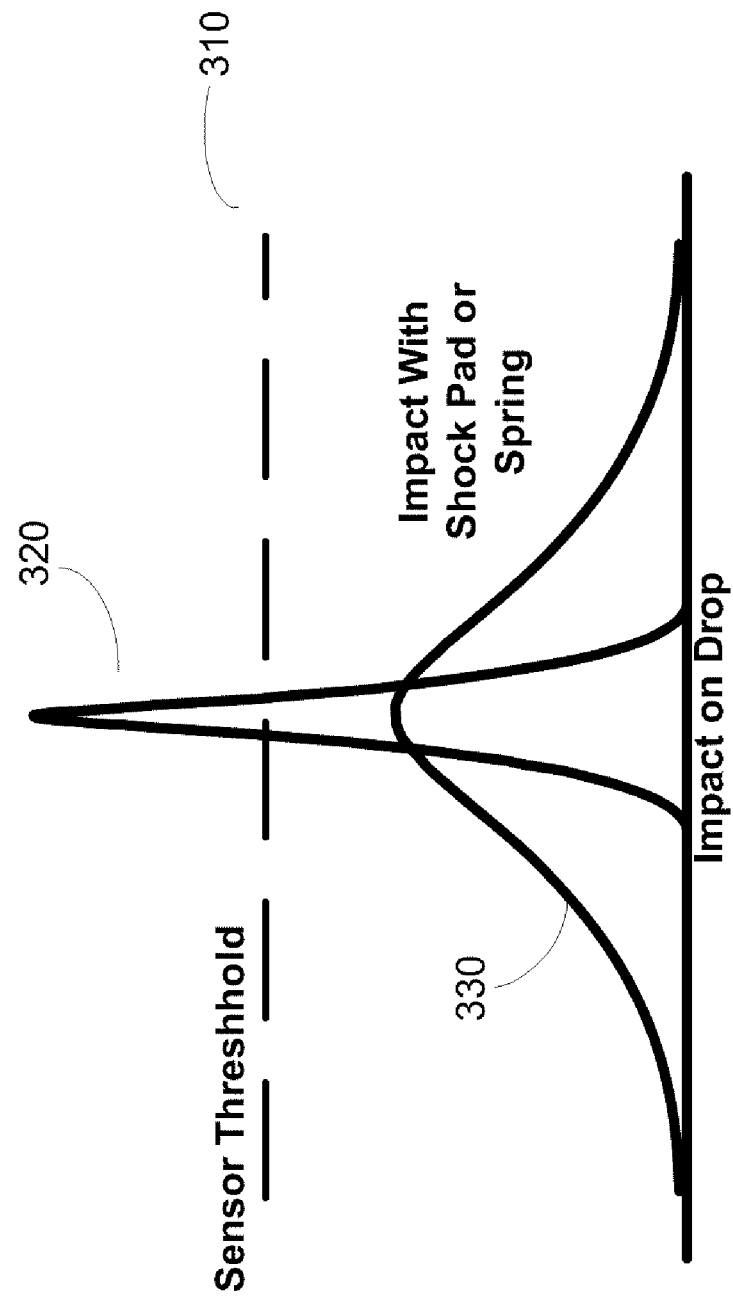
FIG. 3 is an energy graph for drop impact of a container showing a sensor threshold and impact waveforms of force in the vertical axis and time in the horizontal axis for a sensor with and without a shock pad coupled with the sensor.

FIG. 3 is an energy graph for drop impact of a container showing sensor threshold 310 and impact waveforms of force in the vertical axis and time in the horizontal axis for a sensor with shock pad, i.e., waveform 330 and without a shock pad coupled with the sensor, i.e., waveform 320. As shown, without a shock pad (or other shock absorbing device), the force of impact may exceed the sensor threshold and damage the sensor. Other sensors may be impact resistant and not require a shock pad, but may for example be more expensive.

Figure 4:
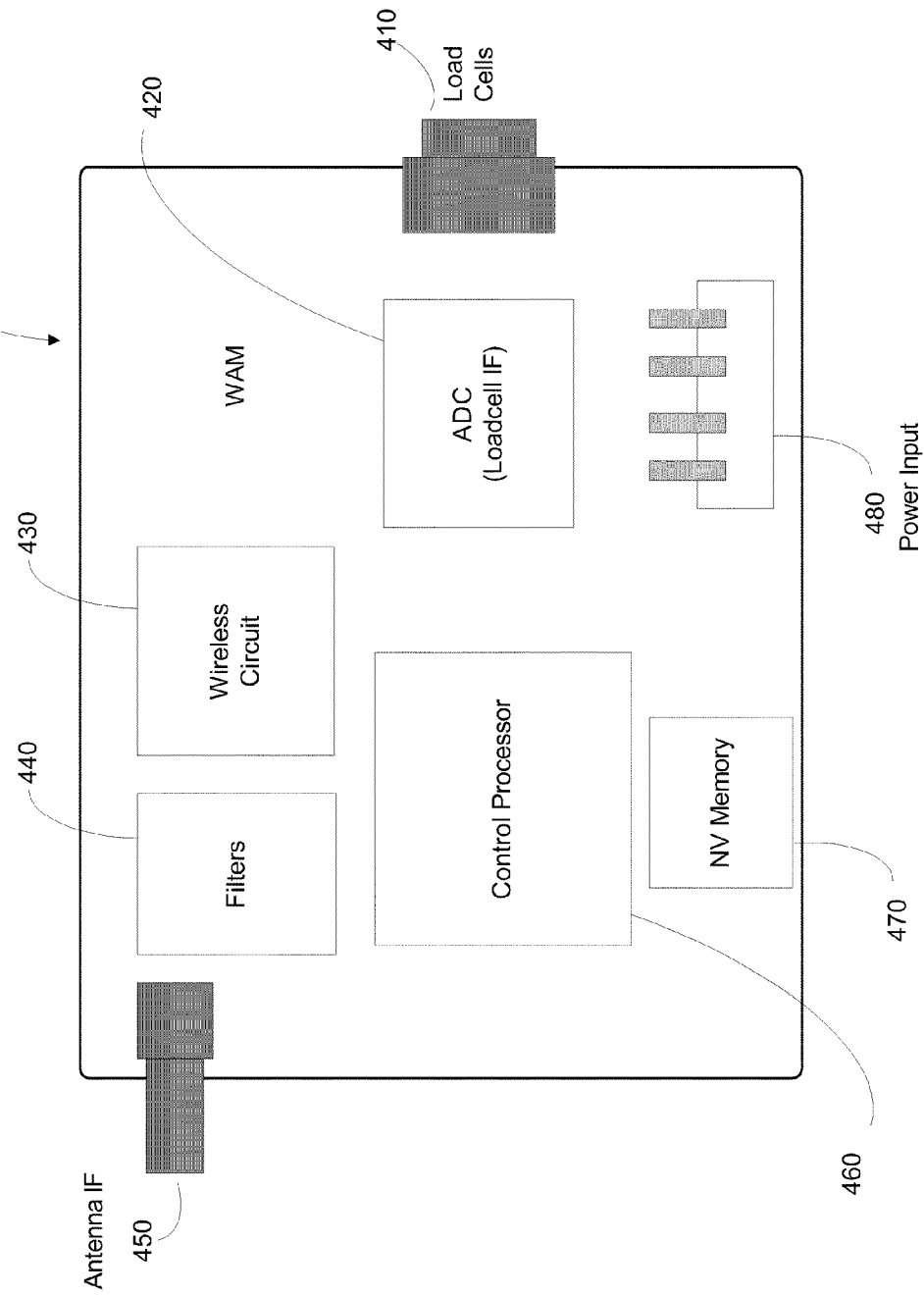
FIG. 4 is an example printed circuit board layout for an embodiment of the wireless transmitter associated with the sensor of the system.

FIG. 4 shows example printed circuit board 400 for an embodiment of the wireless transmitter associated with the sensor of the system. Load cells 410 measure weight associated with item(s) held in the container. The analog to digital interface 420 converts the analog sensor signal into digital sensor data. Wireless circuit 430 interfaces with the central processor unit (or control processor) 460 which in turn interfaces to program code held in memory 470. Wireless circuit 430 may include a wireless transmitter and may also include a wireless receiver for example. Filter 440 may condition wireless signals, for example to receive a particular frequency band via antenna interface 450. In addition, power input 480 may be utilized to power the circuitry and for example may interface with a battery or other power source.

Figure 5:
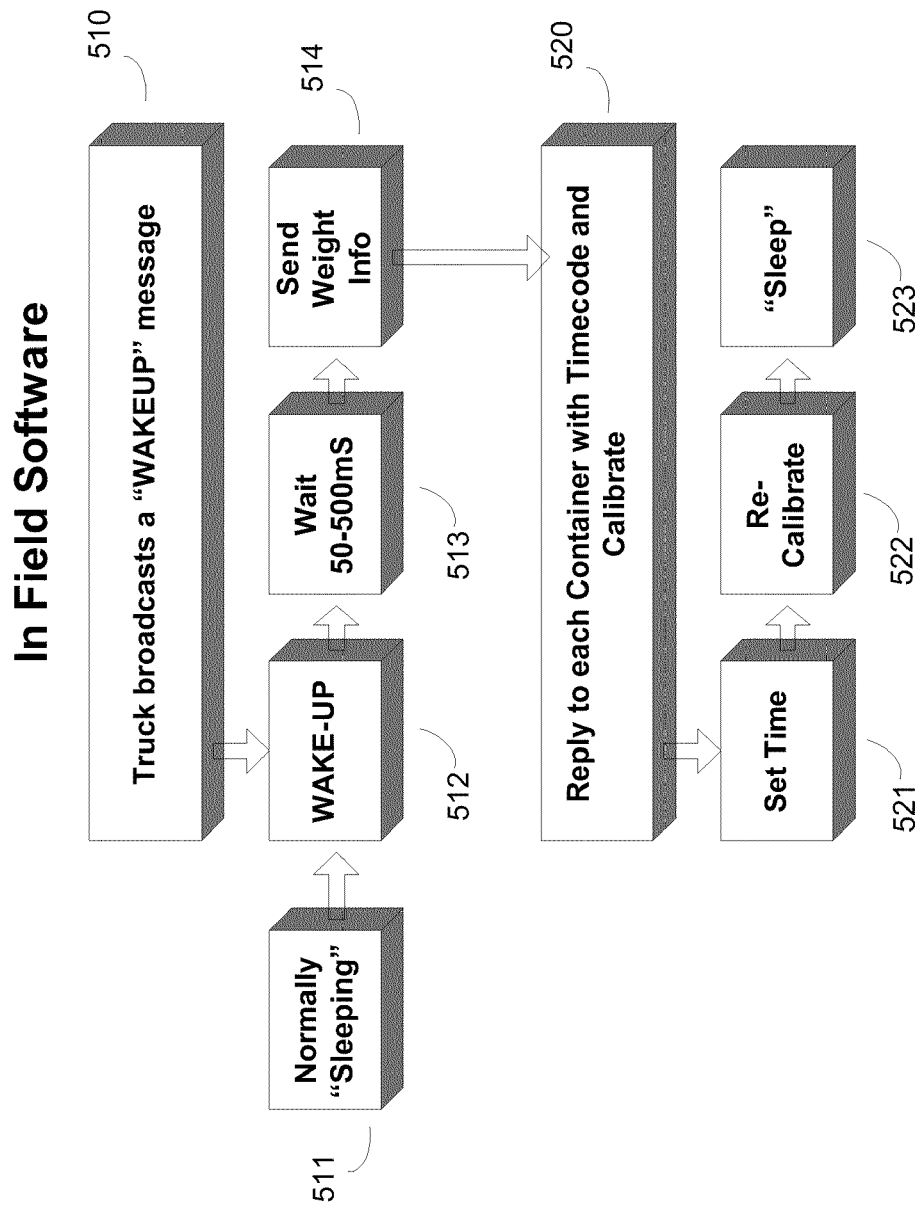
FIG. 5 is a flow chart for an embodiment of the method associated with the program code associated with the printed circuit board of FIG. 4.

FIG. 5 is a flow chart for an embodiment of the method associated with the program code associated with the printed circuit board of FIG. 4. In the figure, the truck broadcasts a wakeup message at 510. The central processor unit of FIG. 4 may be sleeping at 511 to conserve power for example and may be configured to wake up and check for messages at 512 and wait for a configurable time at 513. If the request message is received, then the sensor data is sent at 514. The truck may acknowledge receipt of the sensor data, and optionally of the unique identifier associated with the container at 520 and optionally ask the sensor to recalibrate itself as the container has been emptied. The central processor unit may set optionally set the time at 521, re-calibrate at 522 and sleep again at 523.

FIG. 6 is a truck list as selected by button "Truck", i.e., button 610. The list shows columns associated with trucks 620, truck type 630, route 640, number of lifts 650 and load 660 collected. In this figure, the various trucks are associated with sensor data that is shown as horizontal rows. For example, the first truck has a unique identifier WM-1234 that has a named route, "SouthEast 76" and shows the number of lifts "87" and total load collected "5.6 Tons". The table shown may be implemented as a web page that utilized HTML for example to display the sensor data held in the database (see FIG. 1).

FIG. 7 is a container list as selected by button "Containers", i.e., button 710. The list shows columns associated with each truck of FIG. 6, wherein the list shows the container identifier 720, customer identifier 730, time of pickup 740, load picked-up 750, and battery status 760.

FIG. 8 is a list of sensors 810, phones 820, personal digital assistants (PDAs) 830, and wireless technologies 840 that may be utilized to implement a particular configuration depending on the requirements. Any other sensors, phones, personal digital assistants or wireless technologies may be utilized so long as sensor data associated with a container can be wirelessly transmitted and stored in a database.

Figure 9:
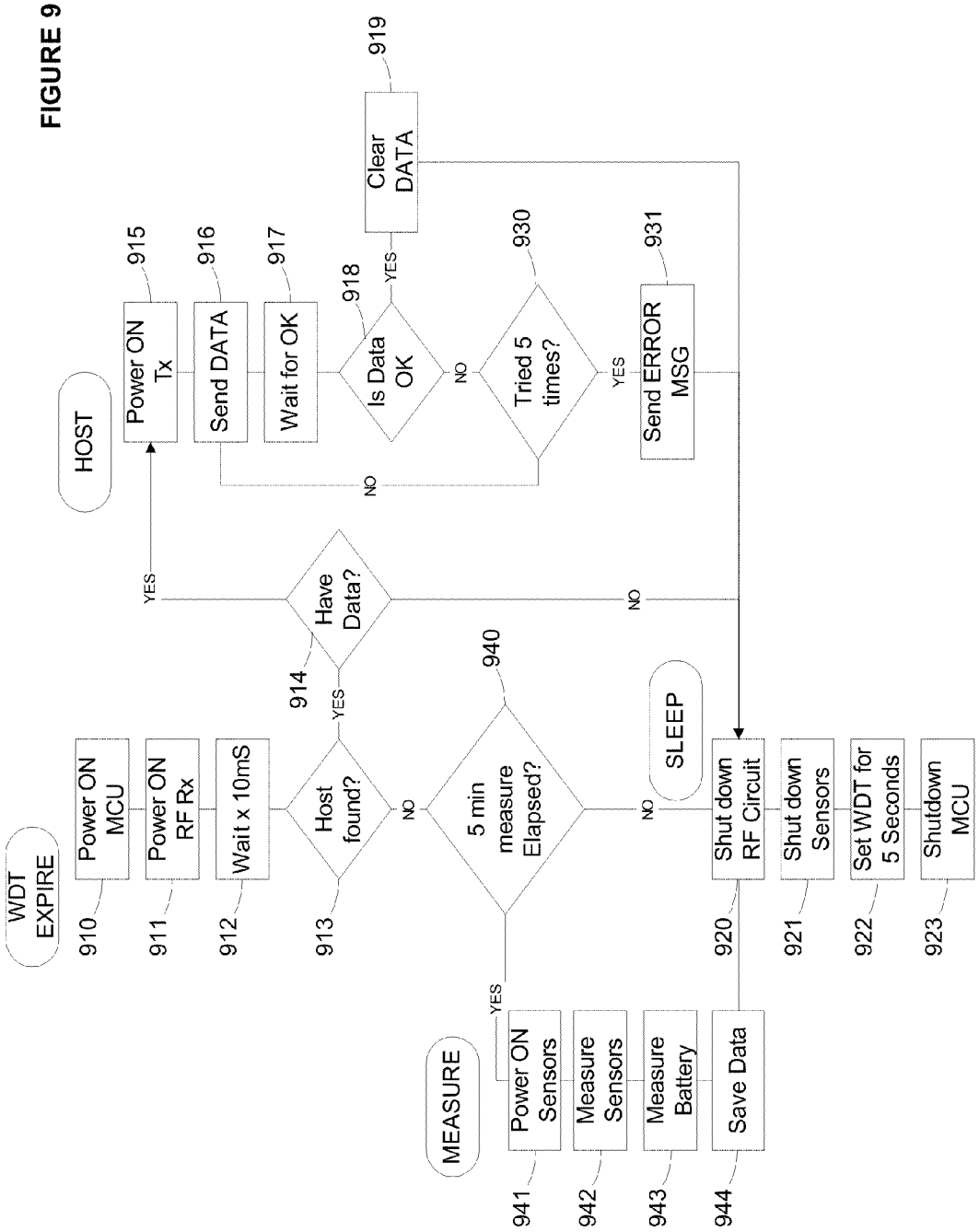
FIG. 9 is a more detailed view of the program code of FIG. 5 as associated with the printed circuit board of FIG. 5.

FIG. 9 is a more detailed view of the program code of FIG. 5 as associated with the printed circuit board of FIG. 5. In this figure, upon a watchdog timer expiration (as shown near the WDT EXPIRE balloon), the Microprocessor Unit (MCU) is powered on at 910. The radio frequency receiver circuitry (RF Rx) is powered on at 911. After an optional wait period that may be implemented for example as 10 msec at 912, a search determination is made at 913 as to whether or not a Host (for example a truck with a transmitter) is found. If a Host is found at 913, then a determination is made as to whether data exists within memory at 914. If data does exist, then a Host transfer occurs (as shown near the HOST balloon), wherein the radio frequency transmitter is powered on at 915. Data is sent via the transmitter at 916 and the microprocessor unit waits for acknowledgment of the transmitter at 917. If the transfer of data completed successfully as per 918, then data is cleared from memory optionally at 919. Alternatively, memory may be simply overwritten during the next measure cycle. After the data is optionally cleared at 919, then the circuitry goes into sleep mode (as shown near the SLEEP balloon) wherein the radio frequency circuitry is powered off at 920, sensors are powered off at 921, a watchdog timer interval of a predetermined value is set, for example 5 seconds at 922, and the microprocessor is powered off at 923. If the data transfer does not complete properly at 918, then the microprocessor may attempt to transfer the data a configurable number of times, by traversing to 916. The determination of the number of repeat transfers have occurred takes place at 930, for example if 5 transfer attempts have been made, then an error message may be sent at 931, wherein the apparatus goes to sleep at 920. In the case that no Host is found at 913, then after a configurable number of minutes, if no measurement has occurred, then the sensors are measured (as shown near the MEASURE balloon) at 941. For example, if 5 minutes have elapsed since the last sensor measurement has occurred, then a measurement is performed at 941, wherein the sensors are powered on. The sensors are measured at 942, the battery is optionally measured at 943 and the data is saved at 944. The apparatus then sleeps at 920. After the system shuts down at 923, the watchdog timer revives the apparatus at 910 and the processing repeats as long as the battery or power source contains sufficient power.

While the invention herein disclosed has been described by means of specific embodiments and applications thereof, numerous modifications and variations could be made thereto by those skilled in the art without departing from the scope of the invention set forth in the claims.

What is claimed is:

1. A wireless active monitor system for containers and carts comprising:
    a container mount configured to couple with a container that is configured to hold at least one item;
    a sensor coupled with the container mount wherein the sensor is configured to produce sensor data associated with the at least one item;
    a wireless transmitter coupled with the sensor wherein the wireless transmitter is configured to transmit the sensor data;
    a wheel casing configured to couple with a wheel wherein said wheel casing is further configured to contain said wireless transmitter; and,
    wherein a top portion of said wheel casing is directly coupled with a bottom portion of said sensor and wherein a top portion of said sensor is directly coupled with a bottom portion of said container mount and wherein said container mount is configured to couple with an existing bottommost flat portion of said container and wherein a height of said wheel casing and said sensor combine approximately to a height of all other wheels coupled with said container.

2. The wireless active monitor system of claim 1 wherein the container is a cart that is mobile.

3. The wireless active monitor system of claim 1 wherein the sensor is configured to measure a physical characteristic.

4. The wireless active monitor system of claim 1 wherein the sensor is configured to measure weight.

5. The wireless active monitor system of claim 1 further comprising a printed circuit board coupled with the wireless transmitter.

6. The wireless active monitor system of claim 5 wherein the printed circuit board further comprises:
    a central processing unit; and,
    memory that comprises program code configured execute on the central processing unit wherein the program code is configured to transmit the sensor data via the wireless transmitter.

7. The wireless active monitor system of claim 6 further comprising:
    a wireless receiver coupled with the printed circuit board wherein the program code is configured to transmit the sensor data via the wireless transmitter upon receipt of a request at the wireless receiver.

8. The wireless active monitor system of claim 6 further comprising:

a wireless receiver coupled with the printed circuit board wherein the central processing unit is configured to wake-up at a time interval and transmit sensor data via the wireless transmitter.

9. The wireless active monitor system of claim 6 wherein the program code is configured to recalibrate the sensor after the container is disassociated with the at least one items.

10. The wireless active monitor system of claim 1 further comprising a shock pad coupled with the sensor and further coupled with the container mount.

11. The wireless active monitor system of claim 1 wherein the wireless transmitter is configured to transmit a unique identifier associated with the container.

12. The wireless active monitor system of claim 1 further comprising an energy source.

13. The wireless active monitor system of claim 1 further comprising:
   a second wireless receiver configured to receive the sensor data from the wireless transmitter.

14. The wireless active monitor system of claim 13 further comprising a database coupled with the second wireless receiver.

15. The wireless active monitor system of claim 14 wherein the second wireless receiver is not coupled with a truck and wherein the second wireless receiver couples with the database and wherein the database receives sensor data obtained via the sensor without use of the truck.

16. The wireless active monitor system of claim 14 wherein the second wireless receiver is coupled with a truck and wherein the truck comprises a second wireless transmitter that is configured to transmit the sensor data obtained via the sensor to the database.

17. The wireless active monitor system of claim 16 wherein the second wireless transmitter is implemented with a cell phone coupled with the second wireless receiver wherein the cell phone is configured to transmit the sensor data obtained via the sensor to the database.

18. The wireless active monitor system of claim 14 further comprising a web server coupled with the database.

19. The wireless active monitor system of claim 13 wherein the wireless transmitter communicates the sensor data wirelessly with the second wireless receiver through use of a Zigbee protocol.

20. A wireless active monitor system for containers and carts comprising:
   a container mount configured to couple with a container that is configured to hold at least one item;
   a sensor coupled with the container mount wherein the sensor is configured to produce sensor data associated with the at least one item and wherein the sensor is configured to measure weight;
   a shock pad coupled with the sensor and further coupled with the container mount;
   a wireless transmitter coupled with the sensor wherein the wireless transmitter is configured to transmit the sensor data;
   a printed circuit board coupled with the wireless transmitter;
   a central processing unit coupled to the printed circuit board;
   memory coupled to the printed circuit board that comprises program code configured execute on the central processing unit wherein the program code is configured to transmit the sensor data via the wireless transmitter;
   wherein the program code is further configured to transmit a unique identifier via the wireless transmitter wherein the unique identifier is associated with the container associated with the wireless transmitter;
   a wheel casing configured to couple with a wheel wherein said wheel casing is further configured to contain said wireless transmitter, said printed circuit board, said central processing unit, and said memory;
   wherein a top portion of said wheel casing is directly coupled with a bottom portion of said sensor and wherein a top portion of said sensor is directly coupled with a bottom portion of said container mount and wherein said container mount is configured to couple with an existing bottommost flat portion of said container and wherein a height of said wheel casing and said sensor combine approximately to a height of all other wheels coupled with said container; and,
   a database configured to hold the sensor data received from the wireless transmitter.

\* \* \* \* \*